United States Patent [19]

Lee, Jr.

[11] 4,113,797

[45] Sep. 12, 1978

[54] THERMOPLASTIC MOLDING COMPOSITIONS OF RUBBER MODIFIED COPOLYMERS OF A VINYL AROMATIC COMPOUND AND AN α,β-UNSATURATED CYCLIC ANHYDRIDE

[75] Inventor: Gim Fun Lee, Jr., Albany, N.Y.

[73] Assignee: General Electric Company, Pittsfield, Mass.

[21] Appl. No.: 671,569

[22] Filed: Mar. 29, 1976

[51] Int. Cl.$^2$ ............................................. C08L 51/04
[52] U.S. Cl. ........................... 260/876 B; 260/30.6 R; 260/42.17; 260/42.18; 260/42.22; 260/42.47; 260/45.7 R; 260/874; 260/876 R; 260/880 B; 260/893
[58] Field of Search ........... 260/876 B, 876 R, 880 B, 260/893, 874

[56] References Cited

U.S. PATENT DOCUMENTS

| 2,903,440 | 9/1959 | Heiligmann | 260/880 |
|---|---|---|---|
| 2,914,505 | 11/1959 | Roper | 260/893 |
| 2,971,939 | 2/1961 | Baer | 260/876 |
| 3,231,635 | 1/1966 | Holden et al. | 260/876 B |
| 3,322,853 | 5/1967 | Trementozzi et al. | 260/880 |
| 3,641,212 | 2/1972 | Narayana et al. | 260/876 B |
| 3,642,949 | 2/1972 | Stafford et al. | 260/880 |
| 3,660,531 | 5/1972 | Lauchlan et al. | 260/876 B |
| 3,689,596 | 9/1972 | Narayana et al. | 260/876 B |

FOREIGN PATENT DOCUMENTS 1,053,596  1/1967  United Kingdom ................. 260/876 B

OTHER PUBLICATIONS

Lyons, The Chem. & Uses of Fire Retardants (Wiley, 1970), pp. 317–321.

*Primary Examiner*—Thomas De Benedictis, Sr.
*Attorney, Agent, or Firm*—Morgan, Finnegan, Pine, Foley & Lee

[57] ABSTRACT

Thermoplastic molding compositions are disclosed which comprise an intimate admixture of (i) from about 5 to about 95 parts by weight of a rubber-modified copolymer of a vinyl aromatic compound and an α,β-unsaturated cyclic anhydride, (ii) from about 30 to about 1 parts by weight of a block or graft copolymer of a vinyl aromatic compound and a conjugated diene, and (iii) from 0 to about 95 parts by weight of a polyphenylene ether resin.

9 Claims, No Drawings

THERMOPLASTIC MOLDING COMPOSITIONS OF RUBBER MODIFIED COPOLYMERS OF A VINYL AROMATIC COMPOUND AND AN α,β-UNSATURATED CYCLIC ANHYDRIDE

The present invention provides thermoplastic molding compositions which comprise an intimate admixture of a rubber-modified copolymer of a vinyl aromatic compound and an α,β-unsaturated cyclic anhydride, and a block or graft copolymer of a vinyl aromatic compound and a diene. Optionally and preferably, a polyphenylene ether resin is included. The resulting compositions are moldable to finished articles having unexpectedly improved mechanical properties, such as improved impact strength and tensile properties.

BACKGROUND OF THE INVENTION

Vinyl aromatic resins, such as polystyrene, for instance, have been found to be useful for thermoplastic molding compositions. However, these resins have poor heat distortion and impact resistance properties, and attempts have been made to upgrade these properties. One approach has been to modify the vinyl aromatic resins by copolymerizing these materials with α,β-unsaturated cyclic anhydrides to form copolymers such as poly(styrene-maleic anhydride). Although improvements in heat resistance and solvent resistance are provided, the resulting copolymers are somewhat brittle and do not have good resistance to impact.

To improve the impact resistance of copolymers of vinyl aromatic resins and α,β-unsaturated cyclic anhydrides, the copolymers have been blended with elastomers. For instance, blends of nitrile rubber and styrene-maleic anhydride copolymers are disclosed in U.S. Pat. Nos. 2,914,505 and 3,641,212. With some of these compositions, however, the components are not compatible and the compositions are difficult to prepare.

In copending U.S. application Ser. No. 477,435, filed June 7, 1974, and assigned to the same assignee as herein, thermoplastic molding compositions are disclosed which comprise an unmodified copolymer of a vinyl aromatic compound and an α,β-unsaturated cyclic anhydride, and an elastomeric linear block copolymer of a vinyl aromatic compound and a diene. The components are compatible over a wide range of proportions and the resulting compositions provide molded articles having good mechanical properties.

It has now been surprisingly discovered that rubber-modified copolymers of a vinyl aromatic compound and an α,β-unsaturated cyclic anhydride can be compatibly admixed with a copolymer of a vinyl aromatic compound and a conjugated diene, to form compositions which are moldable to finished articles of unexpectedly improved mechanical properties. The compositions of this invention provide articles having improved impact strength, tensile properties, and the like, when compared with the compositions of the above-mentioned U.S. Ser. No. 477,435.

SUMMARY OF THE INVENTION

According to the present invention there are provided thermoplastic molding compositions which comprise an intimate admixture of:
(i) from about 5 to about 95 parts by weight of a rubber-modified copolymer of a vinyl aromatic compound and an α,β-unsaturated cyclic anhydride;
(ii) from about 30 to about 1 parts by weight of a block or graft copolymer of a vinyl aromatic compound and a conjugated diene, and
(iii) from 0 to about 95 parts by weight of a polyphenylene ether resin.

DETAILED DESCRIPTION OF THE INVENTION

The rubber-modified copolymers of a vinyl aromatic compound and an α,β-unsaturated cyclic anhydride, (i), are available commercially or can be prepared by following the teachings of the prior art. In general, they are prepared by conventional bulk solution or emulsion techniques using free-radical initiation. For example, styrene-maleic anhydride copolymers can be obtained by simply reacting the two monomers, i.e., styrene and maleic anhydride, at 50° C. in the presence of benzoyl peroxide. The rate of polymerization may be better controlled if a solvent such as acetone, benzene or xylene is used. The rubber-modified copolymers are described in Netherlands No. 7,212,714, which is incorporated herein by reference.

The vinyl aromatic compound of component (i) can be derived from compounds of the formula:

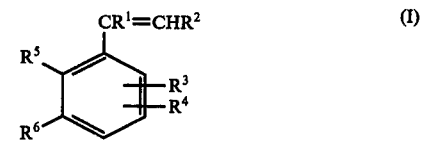

wherein $R^1$ and $R^2$ are selected from the group consisting of (lower) alkyl or alkenyl groups of from 1 to 6 carbon atoms and hydrogen; $R^3$ and $R^4$ are selected from the group consisting of chloro, bromo, hydrogen and (lower) alkyl of from 1 to 6 carbon atoms; $R^5$ and $R^6$ are selected from the group consisting of hydrogen and (lower) alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound.

The α,β-unsaturated cyclic anhydride of component (i) can be represented by the formula:

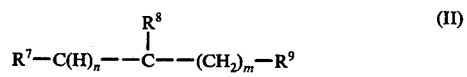

wherein the dotted lines represent a single or a double carbon to carbon bond, $R^7$ and $R^8$ taken together represents a

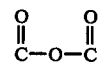

linkage, $R^9$ is selected from the group consisting of hydrogen, vinyl, alkyl, alkenyl, alkylcarboxylic or alkenylcarboxylic of from 1 to 12 carbon atoms, $n$ is 1 or 2, depending on the position of the carbon-carbon double bond, and $m$ is an integer of from 0 to about 10. Examples include maleic anhydride, citraconic anhydride, itaconic anhydride, aconitic anhydride, and the like.

The rubber employed in preparing the rubber-modified copolymers of a vinyl aromatic compound and an α,β-unsaturated cyclic anhydride can be a polybutadiene rubber, butyl rubber, styrene-butadiene rubber, acrylonitrile rubber, ethylene-propylene copolymers, natural rubber, EPDM rubbers, and the like.

Component (i) can comprise from 40 to 1 parts by weight of the α,β-unsaturated cyclic anhydride, from 60 to 99 parts by weight of a vinyl aromatic compound and from 2 to 25 parts by weight of rubber. The preferred copolymers will comprise from about 25 to 5 parts by weight of the α,β-unsaturated cyclic anhydride, from about 75 to 95 parts by weight of the vinyl aromatic compound and about 10 parts by weight of the rubber.

A preferred rubber-modified vinyl aromatic α,β-unsaturated cyclic anhydride copolymer is Dylark 240, available from Arco Polymers. Dylark 240 is a high-impact styrene-maleic anhydride copolymer containing 9–10% rubber, 9% maleic anhydride, and the balance being styrene.

Component (ii) can be a block or graft copolymer, either hydrogenated or unhydrogenated, of a vinyl aromatic compound and a diene, preferably a conjugated diene.

Linear copolymers of the block type are described in "Polymer Chemistry of Synthetic Elastomers", edited by Kennedy et al, Interscience Publishers, Vol. 23, Part II (1969), pp. 553–559. In general, they will be of the A-B-A type, in which the central block, B, will always be that of a conjugated diene, e.g., butadiene, isoprene, 1,3-pentadiene, 2,3-dimethyl-butadiene, and the like, or mixtures of the foregoing. The terminal block, A, will always be derived from a vinyl aromatic compound, e.g., styrene, α-methyl styrene, vinyl toluene, vinyl xylene, vinyl naphthalene, or mixtures of any of the foregoing. In the most preferred compositions, the block copolymer will have terminal blocks, A, comprised of polystyrene and center block, B, comprised of polybutadiene or polyisoprene.

The ratios of the comonomers can vary broadly, so long as the molecular weight of the center block is greater than that of the combined terminal blocks. This appears to be necessary for the impact strength and solvent resistance to be maximized. Preferably, with the above limitation, the molecular weight of each of the terminal blocks will range from about 2,000 to about 100,000, while that of the center block will range from about 25,000 to about 1,000,000.

The linear A-B-A block copolymers are made by an organometallic initiated polymerization process using, for example, sodium or lithium metal or an organic derivative thereof. The diene monomers can be polymerized with a monofunctional or difunctional initiator, as is described in Kennedy et al, mentioned above. Other methods of preparing these block copolymers are described in Zelinski, U.S. Pat. Nos. 3,251,905 and Holden et al, 3,231,635, the disclosures of which are incorporated herein by reference to save unnecessary detail.

The preferred A-B-A type block copolymer is Kraton X-4119, available commercially from Shell Chemical Co., Polymers Division. Also preferred are the Kratons designed as K-1101 (polystyrene-polybutadiene-polystyrene), K-1102 (polystyrene-polybutadiene-polystyrene), and K-1107 (polystyrene-polyisoprene-polystyrene).

Component (ii) can also be a hydrogenated linear block copolymer of the A-B-A type. Such hydrogenated block copolymers can be prepared by means known in the art. These materials and their preparations are described in U.S. Pat. No. 3,431,323, which is incorporated herein by reference.

Prior to hydrogenation, the end blocks of these copolymers comprise homopolymers or copolymers preferably prepared from vinyl aromatic hydrocarbons and, particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene and the like or mixtures thereof. The end blocks may be the same or different. The center block may be derived from, for example, polyisoprene or polybutadiene.

The ratio of the copolymers and the average molecular weights can vary broadly, although the molecular weight of center block should be greater than that of the combined terminal blocks. It is preferred to form terminal blocks A having average molecular weights of from about 4,000 to about 115,000 and center block B with an average molecular weight of from about 20,000 to about 450,000. Still more preferably, the terminal blocks have average molecular weights of 8,000 – 60,000 while the center polymer blocks have an average molecular weight between 50,000 and 300,000. The terminal blocks will preferably comprise 2–33% by weight, or more preferably, 5–30% by weight of the total block polymer. The preferred copolymers will be those formed from a copolymer having a polybutadiene center block wherein 35–55%, or more preferably, 40–50% of the butadiene carbon atoms are vinyl side chains.

The hydrogenated copolymers will have the average unsaturation of the center block only reduced to less than 20% of the original value. It is preferred to have the unsaturation of the center block B reduced to 10%, or more preferably, 5% of its original value.

The block copolymers are formed by techniques well known to those skilled in the art, such as those mentioned above. Hydrogenation may be conducted utilizing a variety of hydrogenation catalysts such as nickel, Raney nickel, copper chromate, molybdenum sulfide and finely divided platinum or other noble metals, on a low surface area carrier.

Hydrogenation may be conducted at any desired temperature or pressure, from atmospheric to 3,000 p.s.i.g., the usual range being between 100 and 1,000 p.s.i.g., at temperatures from 75° to 600° F., for times between 0.1 and 24 hours, preferably from 0.2–8 hours.

The preferred hydrogenated A-B-A block copolymer compositions comprise Kraton G - GXT-0650, Kraton G - GXT-0772, and Kraton G - GXT-0782, available commercially from Shell Chemical Co.

Component (ii) can also be a graft copolymer of a vinyl aromatic compound and a diene. The graft copolymer will preferably comprise from 75 to 10% by weight of a vinyl aromatic monomer and from 25 to 90% by weight of a conjugated diene. The vinyl aromatic monomer and the diene monomer are as mentioned above with respect to the block copolymers, e.g., styrene, α-methyl styrene, vinyl toluene, vinyl xylene, butadiene, isoprene, and the like. Preferably, the graft copolymer will comprise a backbone copolymer of styrene and butadiene, with side chains of polystyrene.

The graft copolymers can be prepared by techniques well known in the art. They can be made, for instance, by emulsion polymerization in which an aqueous emulsion is formed of a mixture of a vinyl aromatic compound, a conjugated diene, and an emulsifying agent. A free radical generating catalyst or a "redox" catalyst is added and the reaction medium is kept at an elevated temperature, e.g., 50°-65° C., with stirring for several hours, or until copolymerization is substantially complete and a polymer latex is formed. Vinyl aromatic monomer is then added to the uncoagulated latex and grafting of the vinyl aromatic to the "backbone" polymer, i.e., the vinyl aromatic-diene copolymer, is effected by introducing a free radical generating catalyst such as, for example, a peroxide catalyst. Polymerization is continued until side chains of vinyl aromatic resin are formed on the backbone polymer. The graft copolymer is then coagulated, recovered, washed and dried.

The polyphenylene ether resin of the compositions is preferably of the formula:

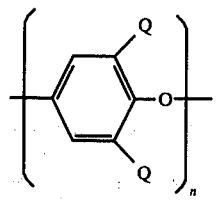
(III)

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

The preparation of polyphenylene ether resins corresponding to the above formula is described in Hay, U.S. Pat. Nos. 3,306,874 and 3,306,875 and in Stamatoff, 3,257,357 and 3,257,358, which are incorporated herein by reference.

Especially preferred polyphenylene ether resins for purposes of the present invention are those having alkyl substitution in the two positions ortho to the oxygen ether atom, i.e., where each Q is alkyl, most preferably, having from 1 to 4 carbon atoms. The most preferred polyphenylene ether resin is poly(2,6 dimethyl-1,4-phenylene) ether - each Q is methyl. Preferably, this polymer should have an intrinsic viscosity of about 0.5 as measured in chloroform at 25° C.

The components of the compositions are combinable in a wide range of proportions. Preferred compositions will comprise from about 5 to about 95 parts by weight of (i) a rubber-modified copolymer of a vinyl aromatic compound and α,β-unsaturated cyclic anhydride, and from about 30 to about 1 parts by weight of (ii) a block or graft copolymer of a vinyl aromatic compound and a diene.

More preferred compositions will comprise from about 5 to about 95 parts by weight of (i) a rubber-modified copolymer of a vinyl aromatic compound and an α,β-unsaturated cyclic anhydride, from about 30 to about 1 parts by weight of (ii) a block or graft copolymer of a vinyl aromatic compound and a diene, and from 5 to about 95 parts by weight of (iii) a polyphenylene ether resin.

In compositions using a graft copolymer as component (ii), a phosphate compound, e.g., from about 0.5 to 5 parts by weight, can also be added to further improve mechanical properties. The phosphate compound is selected from compounds of the formula:

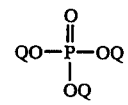
(IV)

wherein each Q is the same or different and is selected from the group consisting of alkyl of from 1 to 10 carbon atoms, e.g., methyl, propyl, isopropyl, n-butyl, isobutyl, hexyl and the like; cycloalkyl of from 1 to 8 carbon atoms, e.g., cyclopropyl, cyclobutyl, cyclohexyl, and the like; aryl, e.g., phenyl, naphthyl and the like; alkaryl, e.g., 2-methylphenyl, 4-n-butylphenyl, 2-ethylphenyl, and the like; aralkyl, e.g., benzyl, phenethyl, phenpropyl, and the like; hydroxy alkyl, e.g., 2-hydroxyethyl, 4-hydroxyhexyl, and the like; hydroxyaryl, e.g., 4-hydroxyphenyl, hydroxynaphthyl, and the like; hydroxyalkaryl, e.g., 4-ethyl-2-hydroxyphenyl, and the like; halogen, e.g., chloro, bromo, fluoro, and the like; and hydrogen. Examples of the phosphate compound include cresyl diphenyl phosphate, 2-ethylhexyl diphenyl phosphate, tricresyl phosphate, triisopropylphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate or mixtures thereof.

Especially preferred is triphenyl phosphate.

The compositions of the invention can also include other ingredients, such as flame retardants, processing aids, pigments, stabilizers, plasticizers, reinforcements, and the like, for their conventionally employed purposes.

Reinforcing fillers, in amounts sufficient to impart reinforcement, can be used, such as aluminum, iron or nickel, and the like, and non-metals, such as carbon filaments, silicates, such as acicular calcium silicate, asbestos, titanium dioxide, potassium titanate and titanate whiskers, glass flakes and fibers.

The preferred reinforcing fillers are of glass. In general, best properties will be obtained if glass filaments are employed in amounts of from about 2 to about 50, preferably from about 10 to about 40 parts by weight. However, higher amounts can be used.

The compositions of this invention can be prepared by blending the components to form a premix, passing the latter through an extruder at an elevated temperature, e.g., 425° to 640° F., cooling and chopping the extrudate into pellets, and molding them into the desired shape.

DESCRIPTION OF THE PREFERRED EMBODIMENTS

The following examples illustrate the compositions of the invention. They are set forth merely as a further illustration and are not to be construed as limiting the invention in any manner.

The compositions of the following examples were prepared by blending the components on a Henschel mixer to form a premix, compounding the premix on a screw extruder at a temperature of about 550° F., and molding the extrudate into test bars on a Newbury injection molding machine.

The particular materials used in the compositions of the Examples are designated as follows:
a Dylark 230, crystal grade, Arco Polymers
b Dylark 240, Arco Polymers
c Kraton GXT-0650, Shell Chemical Co.
d Poly(2,6-dimethyl-1,4-phenylene) ether, I.V. of about 0.5 dl./g. in $CHCl_3$ at 25° C.
e Kraton X-4119, Shell Chemical Co.
f Blendex 525, Marbon Chemical Co.
g Triphenyl phosphate

EXAMPLES 1–5

| Components | 1 | 2 | 3 | 4* | 5* |
|---|---|---|---|---|---|
| Styrene-maleic anhydride copolymer[a] | — | — | — | 80 | 70 |
| Rubber-modified Styrene-maleic anhydride[b] | 95 | 90 | 85 | — | — |
| A—B—A block copolymer[c] | 5 | 10 | 15 | 20 | 30 |

*comparison

Test bars of the above compositions were tested according to ASTM procedures to evaluate physical properties. The results are shown in Table I.

TABLE I

| Property | 1 | 2 | 3 | 4* | 5* |
|---|---|---|---|---|---|
| Izod Impact Strength (ft.lb./in.n.) | 1.9 | 2.4 | 3.2 | 0.5 | 3.8 |
| Tensile Yield (psi × $10^{-3}$) | 6.8 | 6.0 | 5.6 | 5.7 | 4.4 |
| Tensile Elongation (%) | 34 | 40 | 35 | 34 | 48 |
| Gardner Impact Strength (in.-lbs.) | <10 | 20 | 62 | — | — |
| Heat Distortion Temp. (° F) | 209 | 208 | 209 | — | — |

It is shown above that the compositions of Examples 1, 2 and 3, which are in accordance with the invention, provide improved impact strength and tensile elongation when compared with the compositions of Examples 4 and 5, which do not use a rubber-modified styrene-maleic anhydride copolymer.

For instance, the composition of Example 4, which employs 20 parts by weight of A-B-A block copolymer, has an Izod Impact Strength of 0.5 ft.lbs./in.n. and a Tensile Elongation of 34%, whereas the composition of Example 1, which uses a rubber-modified poly(styrene-maleic anhydride) and less A-B-A copolymer, has a relatively higher Izod Impact Strength than that of Example 4 (1.9 ft.lbs./in.n. compared with 0.5 ft.lbs./in.) and a Tensile Elongation equal to that of Example 4.

EXAMPLES 6–11

These examples illustrate the use of a polyphenylene ether resin in the compositions of the invention.

| Components | 6 | 7 | 8 | 9 | 10* | 11* |
|---|---|---|---|---|---|---|
| Styrene-maleic anhydride copolymer[a] | — | — | — | — | 70 | 60 |
| Rubber-modified styrene-maleic anhydride[b] | 85 | 80 | 80 | 75 | — | — |
| A—B—A block copolymer[c] | 5 | 10 | 15 | 15 | 20 | 30 |
| Polyphenylene ether resin[d] | 10 | 10 | 5 | 10 | 10 | 10 |

*comparison

The compositions were tested as in Examples 1–5. The results are shown in Table II.

TABLE II

| Properties | 6 | 7 | 8 | 9 | 10* | 11* |
|---|---|---|---|---|---|---|
| Izod Imp. Strength (ft.lb./in.n.) | 2.7 | 3.6 | 3.8 | 3.3 | 1.1 | 4.0 |
| Tensile Yield (psi × $10^{-3}$) | 7.2 | 6.6 | 5.7 | 6.4 | 6.2 | 5.5 |
| Tensile Elongation (%) | 27 | 33 | 30 | 34 | 32 | 21 |
| Gardner Imp. Strength (in. lbs.) | 10 | 35 | 78 | — | — | — |
| Heat Distortion Temp. (° F) | — | — | — | — | — | — |

*comparison

As in Examples 1–5, it is shown that the use of a rubber-modified copolymer of a vinyl aromatic compound and an α,β-unsaturated cyclic anhydride, e.g., rubber-modified styrene-maleic anhydride, provides compositions having improved Izod Impact Strength.

EXAMPLES 12–16

| Components | 12 | 13 | 14 | 15* | 16* |
|---|---|---|---|---|---|
| Styrene-maleic anhydride copolymer[a] | — | — | — | 80 | 70 |
| Rubber-modified styrene-maleic anhydride[b] | 95 | 90 | 85 | — | — |
| Hydrogenated A—B—A block copolymer[c] | 5 | 10 | 15 | 20 | 30 |

*comparison

These compositions were tested as in Examples 1–5, and the results are shown in Table III.

TABLE III

| Properties | 12 | 13 | 14 | 15* | 16* |
|---|---|---|---|---|---|
| Izod Imp. (ft.lb./in.n.) | 1.7 | 2.0 | 2.2 | 0.8 | 1.1 |
| Tensile Yield (psi × $10^{-3}$) | 7.4 | 6.7 | 5.6 | — | — |
| Tensile Elongation (%) | 26 | 35 | 45 | 8 | 9 |
| Gardner Imp. (in.lbs.) | 10 | 31 | 69 | 45 | 47 |
| Heat Distortion Temp. (° F) | 212 | 210 | 212 | — | — |

EXAMPLES 17–22

| Components | 17 | 18 | 19 | 20 | 21* | 22* |
|---|---|---|---|---|---|---|
| Styrene-maleic anhydride copolymer[a] | — | — | — | — | 70 | 60 |
| Rubber-modified styrene-maleic anhydride[b] | 85 | 80 | 80 | 75 | — | — |
| Hydrogenated A—B—A copolymer[c] | 5 | 10 | 15 | 15 | 20 | 30 |
| Polyphenylene ether resin[d] | 10 | 10 | 5 | 10 | 10 | 10 |

*comparison

The above compositions were tested as in Examples 1-5. The results are shown in Table IV.

TABLE IV

| Properties | 17 | 18 | 19 | 20 | 21* | 22* |
|---|---|---|---|---|---|---|
| Izod Imp. (ft.lb./in.n.) | 2.5 | 3.6 | 3.5 | 4.1 | 2.5 | 5.9 |
| Tensile Elongation (%) | 21 | 26 | 33 | 36 | 13 | 21 |
| Gardner Imp. (in.lb.) | 10 | 69 | 79 | 132 | 114 | 225 |

EXAMPLES 23-26

| Components | 23 | 24 | 25 | 26 |
|---|---|---|---|---|
| Rubber-modified styrene-maleic anhydride copolymer[b] | 100 | 85 | 75 | 75 |
| Styrene-butadiene graft copolymer[f] | — | 15 | 15 | 15 |
| Polyphenylene ether resin[d] | — | — | 10 | 10 |
| Phosphate compound[g] | — | — | — | 2 |

Test results of the above compositions are shown in Table V.

TABLE V

| Property | 23 | 24 | 25 | 26 |
|---|---|---|---|---|
| Izod Imp. (ft.lbs./in.n.) | 1.6 | 1.8 | 2.5 | 3.4 |
| Tensile Elongation (%) | 19 | 28 | 19 | 32 |
| Gardner Imp. (in.-lbs.) | <6 | 41 | 10 | 52 |

Obviously, other modifications and variations of the present invention are possible, in the light of the above teachings. It is, therefore, to be understood that changes may be made in the particular embodiments of the invention described above which are within the full intended scope of the invention as defined in the appended claims.

I claim:

1. A thermoplastic molding composition which comprises an intimate admixture of:
   (i) from about 5 to about 95 parts by weight of a rubber-modified copolymer of a vinyl aromatic compound and an α,β-unsaturated cyclic anhydride;
   (ii) from about 30 to about 1 parts by weight of a block copolymer of a vinyl aromatic compound and a conjugated diene, and
   (iii) from 0 to about 95 parts by weight of a polyphenylene ether resin, said composition having improved impact strength and improved tensile elongation in comparison with a corresponding composition in which the copolymer of a vinyl aromatic compound and an α,β-unsaturated cyclic anhydride is not rubber-modified.

2. A composition as defined in claim 1 wherein, in said rubber modified copolymer of a vinyl aromatic compound and an α,β-unsaturated cyclic anhydride (i), the vinyl aromatic compound is derived from the formula:

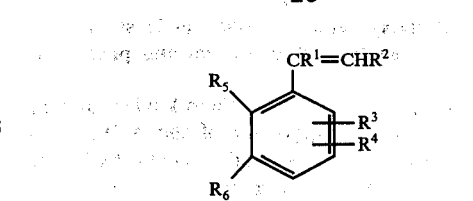

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to about 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbonyl groups to form a naphthyl group, said compounds being free of any substituent that has a tertiary carbon atom; and the α,β-unsaturated cyclic anhydride is represented by the formula:

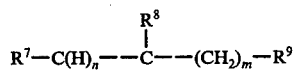

wherein the dotted lines represent a single or a double carbon to carbon bond, $R^7$ and $R^8$ taken together represents a

linkage, $R^9$ is selected from the group consisting of hydrogen, vinyl, alkyl, alkenyl, alkylcarboxylic or alkenylcarboxylic of from 1 to 12 carbon atoms, $n$ is 1 or 2, depending on the position of the carbon-carbon double bond, and $m$ is an integer of from 0 to about 10.

3. A composition as defined in claim 2 wherein said rubber-modified copolymer (i) comprises from 40 to 1 parts by weight of the α,β-unsaturated cyclic anhydride, from 60 to 99 parts by weight of the vinyl aromatic compound and from 2 to 25 parts by weight of rubber.

4. A composition as defined in claim 2 wherein said copolymer (i) is a high impact copolymer of styrene and maleic anhydride which comprises 9-10% rubber, 9% maleic anhydride, and the balance being styrene.

5. A composition as defined in claim 1 wherein said polyphenylene ether resin (iii) is of the formula:

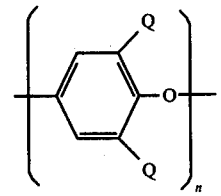

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

6. A composition as defined in claim 1 wherein component (ii) is a block copolymer of the A-B-A type wherein A is a polymerized vinyl aromatic hydrocarbon block having an average molecular weight in the range of from about 2,000 to about 100,000, and B is a polymerized conjugated diene hydrocarbon block having an average molecular weight of from about 25,000 to about 1,000,000, the molecular weight of said center block being greater than that of the combined terminal blocks.

7. A composition as defined in claim 1 wherein component (ii) is a hydrogenated block copolymer of the A-B-A type wherein A is a polymerized vinyl aromatic hydrocarbon block having an average molecular weight in the range of from about 4,000 to about 115,000, and B is a polymerized conjugated diene hydrocarbon block having an average molecular weight of from about 20,000 to about 450,000, and wherein the average unsaturation of center block B has been reduced to less than 20% of its original value.

8. A composition as defined in claim 7 wherein, in said hydrogenated block copolymer, terminal blocks A are present in an amount of from 2 to 33 percent by weight, and the unsaturation of center block B has been reduced to 10% or less of its original value.

9. A composition as defined in claim 1 which further comprises a reinforcing amount of a reinforcing filler.

* * * * *

UNITED STATES PATENT OFFICE
CERTIFICATE OF CORRECTION

Patent No. 4,113,797    Dated September 12, 1978

Inventor(s) Gim Fun Lee, Jr.

It is certified that error appears in the above-identified patent and that said Letters Patent are hereby corrected as shown below:

In Col. 10, line 18, "hydrocarbonyl" should read -- hydrocarbyl --.

Signed and Sealed this

Seventeenth Day of April 1979

[SEAL]

Attest:

RUTH C. MASON
Attesting Officer

DONALD W. BANNER
Commissioner of Patents and Trademarks